United States Patent [19]

Filepp et al.

[11] Patent Number: 5,442,771

[45] Date of Patent: Aug. 15, 1995

[54] METHOD FOR STORING DATA IN AN INTERACTIVE COMPUTER NETWORK

[75] Inventors: Robert Filepp, Springfield, N.J.; Michael L. Gordon, Dobbs Ferry, N.J.; Alexander W. Bidwell, New York, both of N.Y.; Allan M. Wolf, Ridgefield, Conn.; Francis C. Young, Pearl River, N.Y.; Duane Tiemann, Ossining, N.Y.; Kenneth H. Appleman, White Plains, N.Y.; Sam Meo, New York, N.Y.

[73] Assignee: Prodigy Services Company, White Plains, N.Y.

[21] Appl. No.: 158,033

[22] Filed: Nov. 26, 1993

Related U.S. Application Data

[60] Division of Ser. No. 388,156, Jul. 28, 1989, Pat. No. 5,347,632, which is a continuation-in-part of Ser. No. 328,790, Mar. 23, 1989, abandoned, which is a continuation-in-part of Ser. No. 219,931, Jul. 15, 1988, abandoned.

[51] Int. Cl.$^6$ .............................................. G06F 13/14
[52] U.S. Cl. ................... 395/650; 395/497.02; 395/487; 395/154; 395/200.08; 395/600
[58] Field of Search ............................. 395/400, 425

[56] References Cited

U.S. PATENT DOCUMENTS 4,751,635  6/1988  Kret ................................. 364/200

Primary Examiner—David L. Robertson

Attorney, Agent, or Firm—Paul C. Scifo

[57] ABSTRACT

A method for storing data in an interactive computer network is described. In preferred form, the method features steps for establishing data stores of prescribed capacities within a network for delivering an interactive service. The stored data is used in presenting the applications that makeup the service. The method features steps for associating storage control parameters with the application data to be stored and supplying data to the respective stores in excess of their respective capacities. The method includes steps for retaining data at the stores based on the respective prescribed storage control parameters and the date usage experience at the respective stores. In preferred form, the method features steps for providing the data stores with a temporary cache for storing data during a data use session and a variable-content, permanent, file for retaining data between data use sessions. The method configures the cache from available RAM and a prescribed disk file, and the stage from a content-variable, permanent disk file. Data is retained at the cache and subsequently at the stage based on control parameters associated with the data identification, storage candidacy and version, as combined with a least-recently-used criterion. Accordingly, over multiple use sessions, the stage self-configures with data tailored to use experience. Also in the preferred form of the method described, the data is arranged as objects having a header including the storage control parameters.

20 Claims, 9 Drawing Sheets

RECEPTION SYSTEM LAYERS

METHOD FOR STORING DATA IN AN INTERACTIVE COMPUTER NETWORK

RELATED APPLICATIONS

This is a division of application Ser. No. 388,156 filed Jul. 28, 1989, which issued Sep. 13, 1994, as U.S. Pat. No. 5,347,632, application Ser. No. 388,156 being a continuation in part of application Ser. No. 328,790, filed Mar. 23, 1989 now abandoned, which itself was a continuation in part of application Ser. No. 219,931, filed Jul. 15, 1988 now abandoned.

BACKGROUND OF THE INVENTION

1. Field of Use

This invention relates generally to a method for storing data in a distributed processing, interactive computer network intended to provide very large numbers of simultaneous users; e.g. millions, access to an interactive service having large numbers; e.g., thousands, of applications which include pre-created, interactive text/graphic sessions; and more particularly, to a method for storing data used in generating such applications, the method featuring steps for establishing data stores, the stores including first store portions maintained during data usage sessions and second store portions maintained during and between data usage sessions, the method also featuring steps for associating storage control parameters with the data, steps for supplying data to the stores in excess of store capacity, and steps for deleting data from the stores on a least-recently-used basis, so that data is retained at the stores dependent on the storage control parameters and data usage experience.

2. Prior Art

Interactive computer networks are not new. Traditionally they have included conventional, hierarchical architectures wherein a central, host computer responds to the information requests of multiple users. An illustration would be a time-sharing network in which multiple users, each at a remote terminal, log onto a host that provides data and software resource for sequentially receiving user data processing requests, executing them and supplying responses back to the users.

While such networks have been successful in making the processing power of large computers available to many users, problems have existed with them. For example, in such networks, the host has been required to satisfy all the user data processing requests. As a result, processing bottlenecks arise at the host that cause network slowdowns and compel expansion in computing resources; i.e., bigger and more complex computer facilities, where response times are sought to be held low in the face of increasing user populations.

Host size and complexity, however, are liabilities for interactive networks recently introduced to offer large numbers of the public access to transactional services such as home shopping, banking, and investment maintenance, as well as informational services concerning entertainment, business and personal matters.

As can be appreciated, commercial interactive networks will have to provide attractive services at low cost and with minimal response times in order to be successful. Unlike military and governmental networks where, because of the compulsory nature of the service performed, costs, content and efficiency are of secondary concern, in commercial services, since use is predominantly elective, and paid for by the consumer, costs will have to be held low, content made interesting and response times reduced in order to attract and hold both users who would subscribe to the service and merchandisers who would rely on it as a channel of distribution for their good and services. Accordingly, and as will be appreciated, the ability of the network to rapidly satisfy large numbers of user requests with minimal resources is fundamental to the ultimate success of the network.

As pointed out in our parent application, Ser. No. 388,156 filed Jul. 28, 1989, now issued as U.S. Pat. No. 5,347,632, breakthrough performance improvement, essential to the feasibility of broad-based, interactive services can be realized by storing application data local to the user sites and relying on the user site computing resources to manage the interactive session. As more fully described in our parent application, by locating application data closer to the user, for example, at the user terminal configured as a reception system and/or a concentrator facility hierarchically disposed between the reception system and the service host, line traffic and associated response time that would otherwise be required to retrieve data from a conventional, time-share host can be substantially reduced. Further, since the host and concentrator computers of the reception-system based systems we described can be configured as server facilities, they can be provided substantially less expensively than conventionally time-share hosts, thereby, reducing the capital and operating costs required for the service.

However, formulating storage facilities for use in such a network is not without significant problems. As will be appreciated, the amount of storage capacity available at conventional user sites, and for that matter, concentrator facilities, is limited. Accordingly, because of capacity limitations, it would not be physically and economically practical to attempt to store the entire service database at the reception system or concentrator sites. Further, even if storage capacity sufficient to accommodate substantial portions, if not all, of the service database could be provided, the need to maintain the application data current would foreclose storing all data locally or at the concentrator. As will be appreciated, the data for numerous applications of a successful interactive service must remain current for the service to be commercially viable. News stories, stock quotes, prices of goods, as well as items like airline and entertainment seating and scheduling are all time sensitive and must be regularly updated to avoid inconvenience and potential legal liability. Accordingly, even if all data could be provided locally, it would be unwise and objectionable to do so.

SUMMARY OF INVENTION

Accordingly, it is an object of this invention to provide a method for storing data in an interactive-service network.

It is another object of this invention to provide a method for storing data in an interactive-service network, which method reduces communication line traffic required to support the service at user sites.

It is still another object of this invention to provide a method for storing data in an interactive-service network, which method allows adequate amounts of data to be stored in limited-capacity storage facilities.

It is yet another object of this invention to provide a method for storing data in an interactive-service network, which method allows for maintaining currency of the data used to present applications.

It is a again a further object of this invention to provide a method for storing data in an interactive-service network which method automatically configures the data stores to include data tailored to the service usage experience.

Briefly, the method for storing data in accordance with this invention achieves the above-noted and other objects by featuring steps for establishing data stores of prescribed capacities within the network from which data may be obtained for generating the service applications during user sessions. Further, the method features steps for associating storage control parameters with the application data to be stored and supplying data to the respective stores in excess of their respective capacities. Yet further, the method features steps for retaining data at the stores based on the respective prescribed storage control parameters and the date-usage experience at the respective stores.

In accordance with the invention, data stores are established within the service network, preferably at least at the user reception system, and, if provided, also at network concentrator facilities hierarchically located between the reception system and the network host. The size of the respective stores depends on the available resources; i.e., RAM and disk memory, and is allocated between a temporary cache and variable-content permanent stage, the cache being provided at available RAM and a fixed disk file, and the stage being configured as a variable-content, fixed disk file. In accordance with the invention, data stored during a data-use session; e.g., a user interactive session, is stored at the cache distributed between RAM and the cache disk file, while data retained between data-use sessions is stored at the stage permanent disk file.

As a further feature of the invention, data is supplied to the respective stores in excess of their respective capacities, and in preferred form excess data is deleted in accordance with a least-recently-used criterion and storage candidacy conditions ascribed to the data. Still further, in preferred form a version storage control parameter may also be applied.

In operation, as data is supplied to the store; for example, a reception system store during a user interactive session, data is retained at the store based on the available cache space within the store; i.e., reception system available RAM and designated disk file. Particularly, data items designated by a data identification number are placed on a list of recently called data items, the most recently called items being at the top of the list. As new data is called, it pushes previously called data down on the list, with the result that a data item pushed below the list capacity forfeits its presence on the list if not recalled before being pushed off. If data is recalled during a session, it once more is promoted to the top of the data list. At the end of a session, data items at the cache are written to a stage least-recently-used list, the stage retaining data items between sessions in the same fashion the cache retains data during a session. The result is, over a series of sessions, the stage automatically configures itself; i.e., self-configures, with the data most often called. And, as will be appreciated, where the most frequently called data is retained, the efficiency of the limited capacity store to reduce response time is maximized; i.e., need for line data requests is minimized by having data tailored to the user readily available.

Also in accordance with the invention, to insure currency is maintained for time-sensitive data; as for example, data relating to news, pricing, availability, etc., storage candidacy and version control parameters are impressed on the data to avoid storage of data considered too sensitive to be maintained on a least-recently-used basis alone. In preferred form, a range of storage candidacy values are provided and ascribed to the data that dictate whether the respective data can be stored beyond the user session or between user sessions. In this regard, multiple storage qualifying categories can be established with a combination of control parameters concerning data version, storage candidacy value and application of the least-recently-used criterion above described.

Yet further, in preferred form, the application data is organized as objects having a header with one or more data segments, the header being formulated to include the data identification, storage candidacy, and version storage control parameters. Still further, in accordance with the preferred form, the storage method may be applied to all levels of storage in the interactive-service network; i.e., reception system, concentrator facility and host.

DESCRIPTION OF THE DRAWINGS

The above and further objects, features and advantages of the invention will become clear from the following more detailed description when read with reference to the accompanying drawings in which.

DESCRIPTION OF THE PREFERRED EMBODIMENT

General System Description

Figure 1:
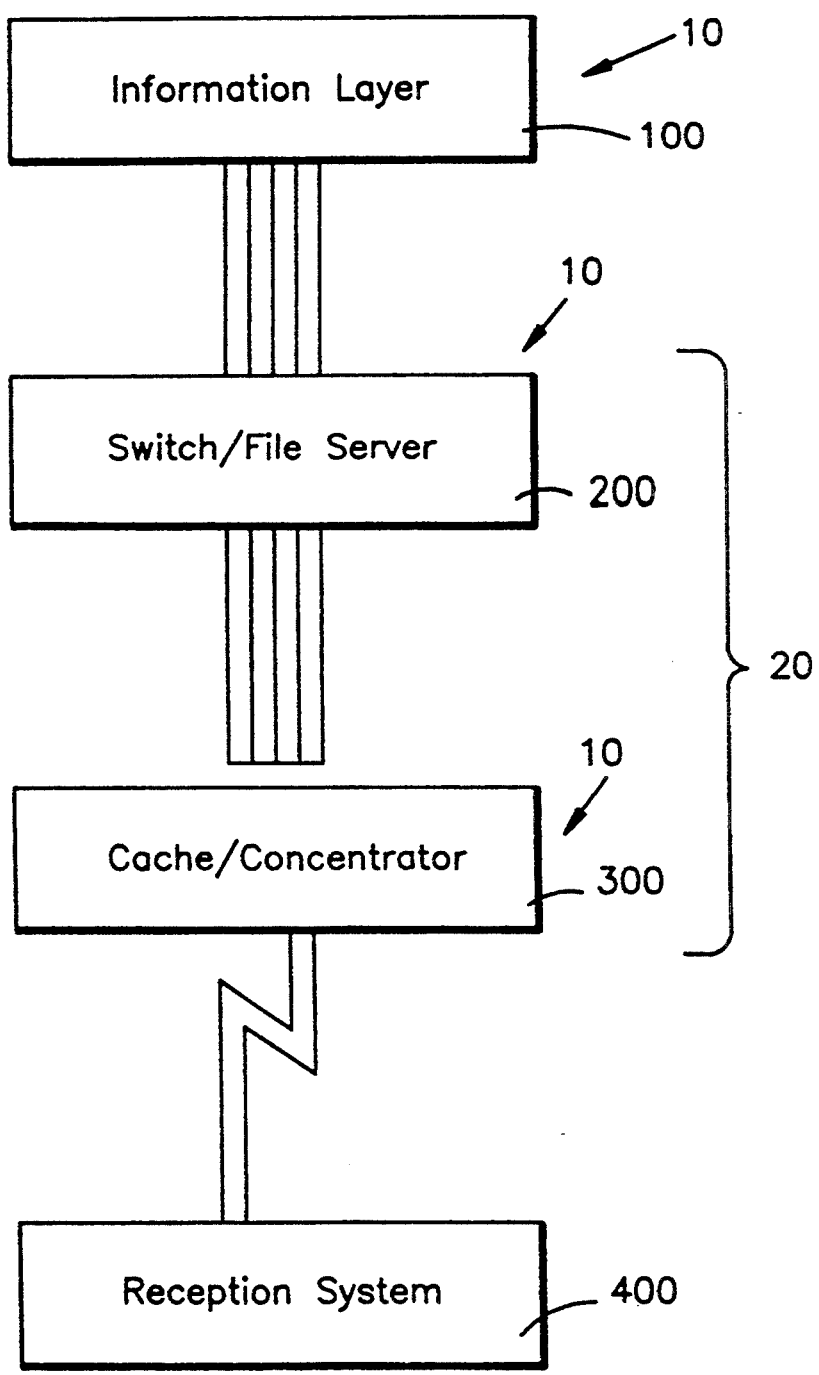
FIG. 1 is a block diagram of the interactive computer network in which the data-storage method of the present invention may be employed.
Figure 2:
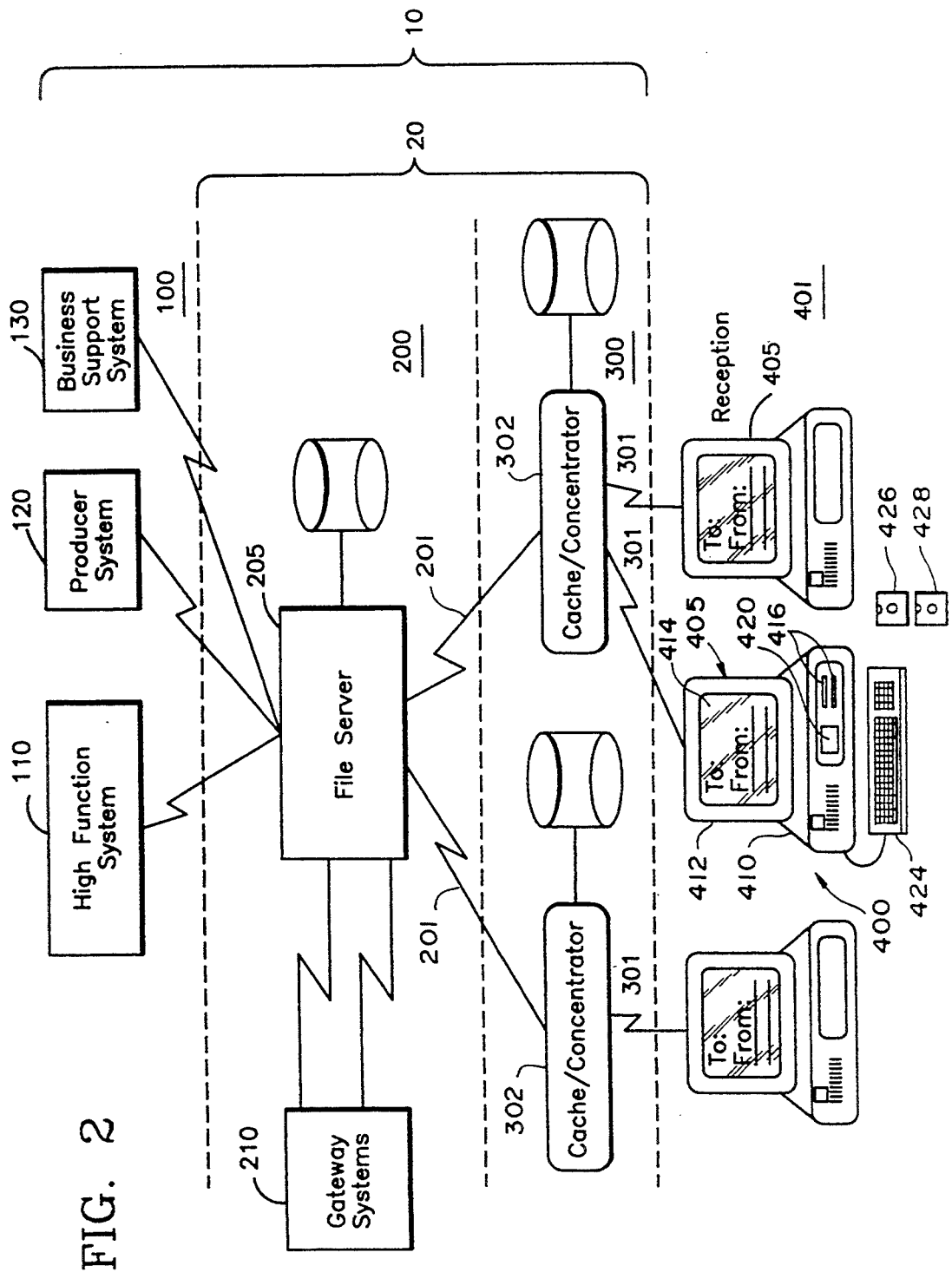
FIG. 2 is a schematic diagram of the network illustrated in FIG. 1.

FIGS. 1 and 2 show a network in which the method of the present invention for storing data might be used. As seen the network, designated 10, and described more fully in U.S. Pat. No. 5,347,632, the contents of which are incorporated herein by reference, includes a plurality of reception units within a reception layer 401 for displaying information and providing transactional services. In this arrangement, many users each access network 10 with a conventional personal computer; e.g., one of the IBM or IBM-compatible type, which has been provided with application software to constitute a reception system (RS) 400.

As seen in FIG. 1, interactive network 10 uses a layered structure that includes an information layer 100, a switch/file server layer 200, and cache/concentrator layer 300 as well as reception layer 401. This structure maintains active application databases and delivers requested parts of the databases on demand to the plurality of RSs 400, shown in FIG. 2. As seen in FIG. 2, cache/concentrator layer 300 includes a plurality of cache/concentrator units 302, each of which serve a plurality of RS 400 units over lines 301. Additionally, switch/file server layer 200 is seen to include a server unit 205 connected to multiple cache/concentrator units 302 over lines 201. Still further, server unit 205 is seen to be connected to information layer 100 and its various elements, which act as means for producing, supplying and maintaining the network databases and other information necessary to support network 10. Continuing, switch/filer layer 200 is also seen to include gateway systems 210 connected to server 205. Gateways 210 couple layer 200 to other sources of information and data; e.g., other computer systems. As will be appreciated by those skilled in the art, layer 200, like layers 401 and 300, could also include multiple servers, gateways and information layers in the event even larger numbers of users were sought to be served.

RS 400 formulated in this fashion is capable of communication with the host system to receive information containing either of two types of data, namely objects and messages. Objects have a uniform, self-defining format known to RS 400, and include data types, such as interpretable programs and presentation data for display at monitor screen 414 of the user's personal computer 405. Applications presented at RS 400 are partitioned into objects which represent the minimal units available from the higher levels of interactive network 10 or RS 400. In this arrangement, each application partition typically represents one screen or a partial screen of information, including fields filled with data used in transactions with network 10. Each such screen, commonly called a page, is represented by its parts and is described in a page template object, discussed below.

Applications, having been partitioned into minimal units, are available from higher elements of network 10 or RS 400, and are retrieved on demand by RS 400 for interpretive execution. Thus, not all partitions of a partitioned application need be resident at RS 400 to process a selected partition, thereby raising the storage efficiency of the user's RS 400 and minimizing response time. Each application partition is an independent, self-contained unit and can operate correctly by itself. Each partition may refer to other partitions either statically or dynamically. Static references are built into the partitioned application, while dynamic references are created from the execution of program logic using a set of parameters, such as user demographics or locale.

Objects provide a means of packaging and distributing partitioned applications. As noted, objects make up one or more partitioned applications, and are retrieved on demand by a user's RS 400 for interpretive execution and selective storage. All objects are interpreted by RS 400, thereby enabling applications to be developed independently of the personal computer brand used.

Objects may be nested within one another or referenced by an object identifier (object-id) from within their data structure. References to objects permit the size of objects to be minimized. Further, the time required to display a page is minimized when, in accordance with the method of the present invention, referenced objects are stored locally at RS 400 (which storage is determined by prior usage meeting certain retention criteria to be described more fully below), or have been pre-fetched, or in fact, are already used for the current page.

RS 400 includes a means to communicate with network 10 to retrieve objects in response to events occurring at RS 400 and to send and receive messages.

In accordance with the method of the present invention, RS 400 includes a means to selectively store objects according to a predetermined storage criterion, thus enabling frequently used objects to be stored locally at the RS, and causing infrequently used objects to forfeit their local storage location. The currency of objects stored locally at the RS 400 is verified before use according to the object's storage control parameters and the storage criterion in use for version checking.

Selective storage tailors the contents of the RS 400 memory to contain objects representing all or significant parts of partitioned applications favored by the user. Because selective storage of objects is local, response time is reduced for those partitioned applications that the user accesses most frequently.

Since much of the application processing formerly done by a host computer in previously known time-sharing networks is now performed at the user's RS 400, the higher elements of network 10, particularly layer 200, has as their primary functions the routing of messages, serving of objects, and line concentration. The narrowed functional load of the higher network elements permits many more users to be serviced within the same bounds of computer power and I/O capability of conventional host-centered architectures.

SYSTEM CONFIGURATION

As shown in FIG. 1, interactive computer network 10 includes four layers: information layer 100, switch and file server layer 200, concentrator layer 300, and reception layer 401.

There are two types of information in the network 10 which are utilized by the RS 400: objects and messages.

Objects include the information requested and utilized by the RS 400 to permit a user to select specific parts of applications, control the flow of information relating to the applications, and to supply information to the network. Objects are self-describing structures organized in accordance with a specific data object architecture, described below. Objects are used to package presentation data and program instructions required to support the partitioned applications and advertising presented at a RS 400. Objects are distributed on demand throughout interactive network 10. Objects may contain: control information; program instructions to set up an application processing environment and to process user or network created events; information about what is to be displayed and how it is to be displayed; references to programs to be interpretively executed; and references to other objects, which may be called based upon certain conditions or the occurrence of certain events at the user's personal computer, resulting in the selection and retrieval of other partitioned applications packaged as objects.

Messages are information provided by the user or the network and are used in fields defined within the constructs of an object, and are seen on the user's RS monitor 412, or are used for data processing at RS 400. Additionally, and as more fully described hereafter, messages are the primary means for communication within and without the network. The format of messages is application dependent. If the message is input by the user, it is formatted by the partitioned application currently being processed on RS 400. Likewise, and with reference to FIG. 2, if the data are provided from a co-application database residing in delivery system 20, or accessed via gateway 210 or high function system 110 within the information layer 100, the partitioned application currently being processed on RS 400 causes the message data to be displayed in fields on the user's display monitor as defined by the particular partitioned application.

All active objects reside in file server 205. Inactive objects or objects in preparation reside in producer system 120. Objects recently introduced into delivery system 20 from the producer system 120 will be available from file server 205, but, may not be available on cache/concentrator 302 to which the user's RS 400 has dialed. If such objects are requested by the RS 400, the cache/concentrator 302 automatically requests the object from file server 205. The requested object is routed back to the requesting cache/concentrator 302, which automatically routes it to the communications line on which the request was originally made, from which it is received by the RS 400.

The RS 400 is the point of application session control because it has the ability to select and randomly access objects representing all or part of partitioned applications and their data. RS 400 processes objects according to information contained therein and events created by the user on personal computer 405.

Applications on network 10 act in concert with the distributed partitioned applications running on RS 400. Partitioned applications constructed as groups of objects and are distributed on demand to a user's RS 400. An application partition represents the minimum amount of information and program logic needed to present a page or window, i.e. portion of a page presented to the user, perform transactions with the interactive network 10, and perform traditional data processing operations, as required, including selecting another partitioned application to be processed upon a user generated completion event for the current partitioned application.

In accordance with the invention, objects representing all or part of partitioned applications may be stored in a user's RS 400 if the objects meet certain criteria, such as being non-volatile, noncritical to network integrity, or if they are critical to ensuring reasonable response time. Such objects are either provided on diskettes 426 together with RS 400 system software used during the installation procedure or they are automatically requested by RS 400 when the user makes selections requiring objects not present in RS 400. In the latter case, RS 400 requests from cache/concentrator layer 300 only the objects necessary to execute the desired partitioned application.

APPLICATIONS AND PAGES

Figure 3A:
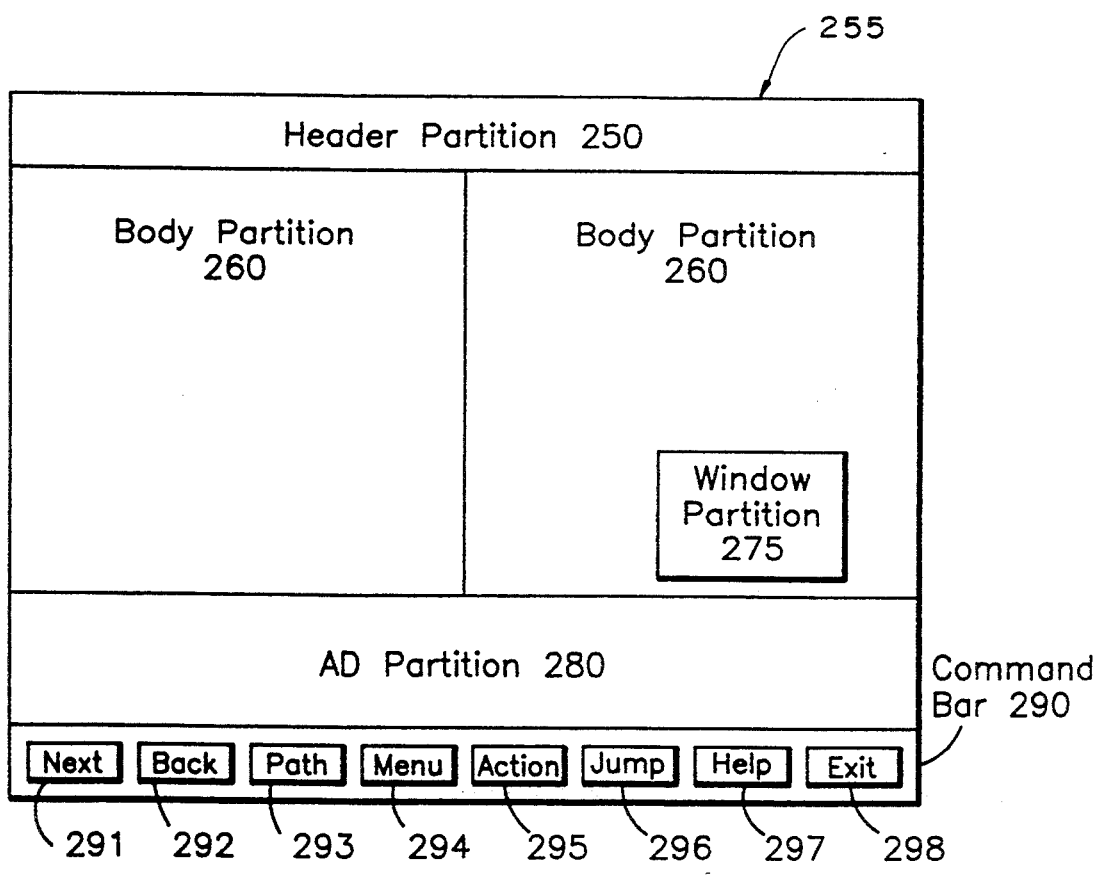
FIG. 3a and 3b are plan views of a display screen for a user reception system employed in a network in which the data-storage method of the present invention may be practiced.
Figure 3B:
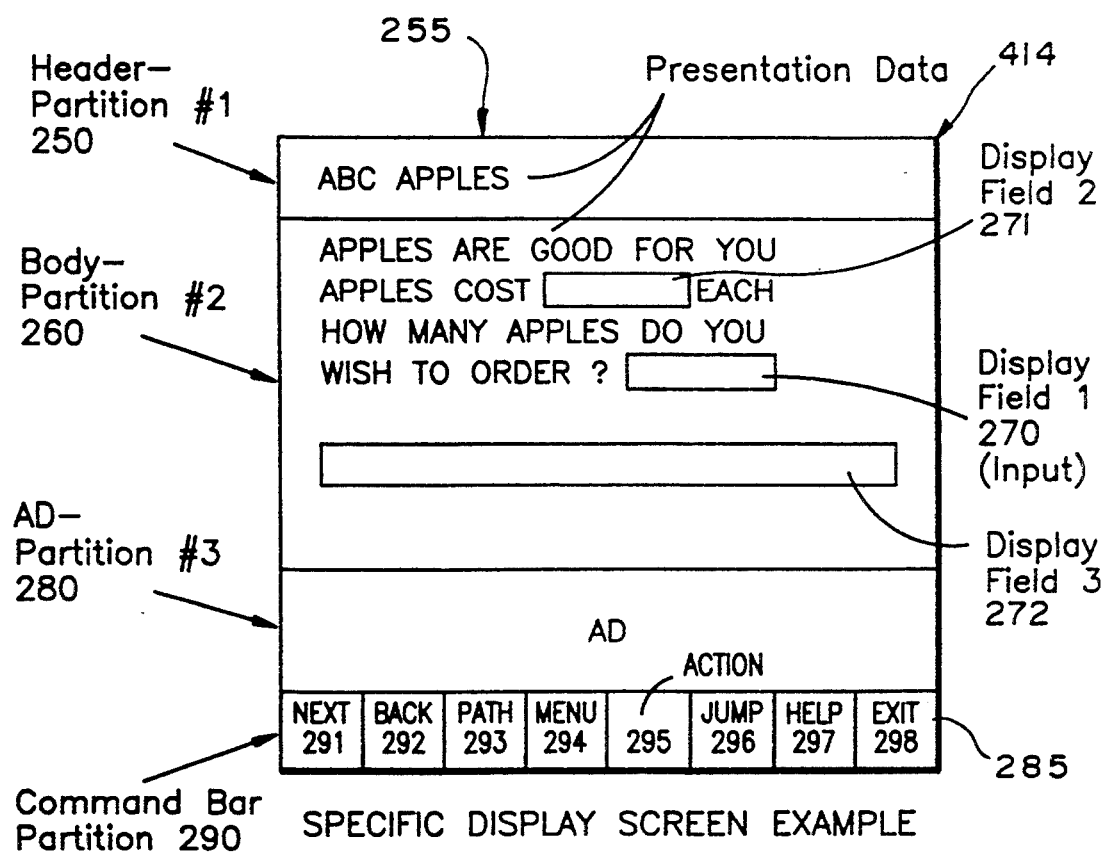

Applications, i.e. information events, are composed of a sequence of one or more pages opened at screen 414 of monitor 412. This is better seen with reference to FIG. 3a and 3b were a page 255 is illustrated as might appear at screen 414 of monitor 412. With reference to FIG. 3a, each page 255 is formatted with a service interface having page partitions 250, 260, 280, and 290 (not to be confused with application partitions). Window page partitions 275, well known in the art, are also available and are opened and closed conditionally on page 255 upon the occurrence of an event specified in the application being run. Each page partition 250, 260, 280 and 290 and window 275 is made up of a page element which defines the content of the partition or window.

NETWORK OBJECTS

As noted above, in conventional time-sharing computer networks, the data and program instructions necessary to support user sessions are maintained at a central host computer. However, that approach has been found to create processing bottlenecks as greater numbers of users are connected to the network; bottlenecks which require increases in processing power and complexity; e.g., multiple hosts of greater computing capability, if the network is to meet demand. Further, such bottlenecks have been found to also slow response time as more users are connected to the network and seek to have their requests for data processing answered.

The consequences of the host processing bottlenecking is to either compel capital expenditures to expand host processing capability, or accept longer response times; i.e., a slower network, and risk user dissatisfaction.

However, even in the case where additional computing power is added, and where response time is allowed to increase, eventually the host becomes user saturated as more and more users are sought to be served by the network. The network described above, however, is designed to alleviate the effects of host-centered limitations, and extend the network saturation point. This objective is achieved by reducing the demand on the host for processing resources by structuring the network so that the higher network levels act primarily to maintain and supply data and programs to the lower levels of the network, particularly RS 400, which acts to manage and sustain the user screen displays.

More particularly, the described network features procedures for parsing the network data and program instructions required to support the interactive user sessions into packets, referred to as objects, and distributing them into the network where they can be stored and processed at lower levels, particularly, reception system 400.

Figure 4A:
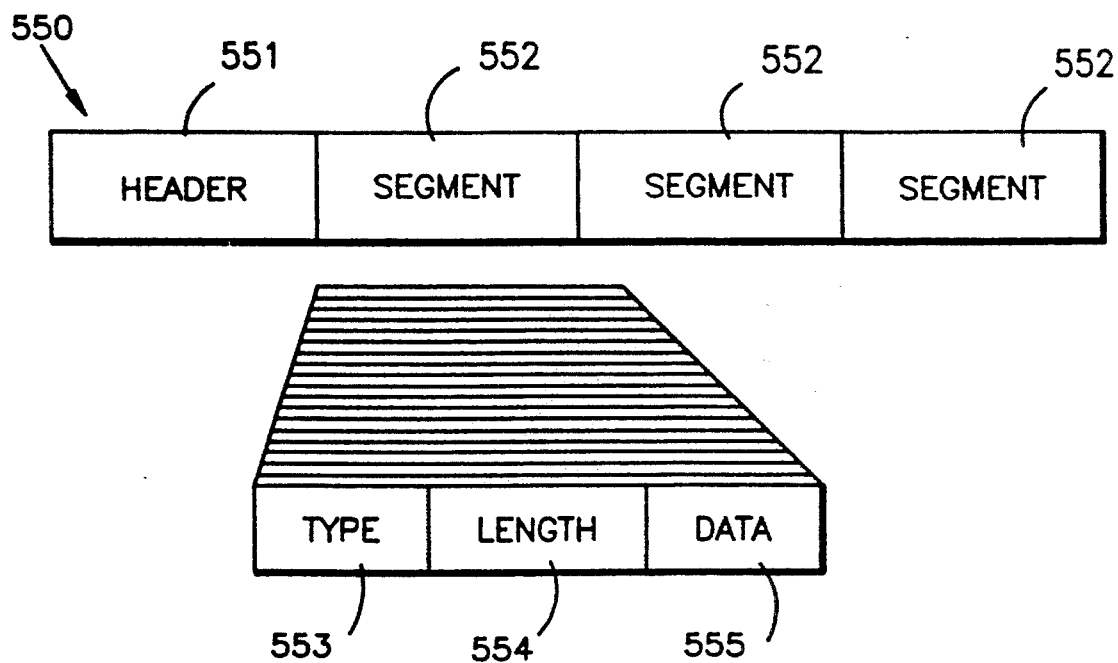
FIGS. 4a, 4b and 4c are schematic drawings that illustrate the structure of objects, and object segments that may be used in a network in which the data-storage method of the present invention may be employed.
Figure 4B:
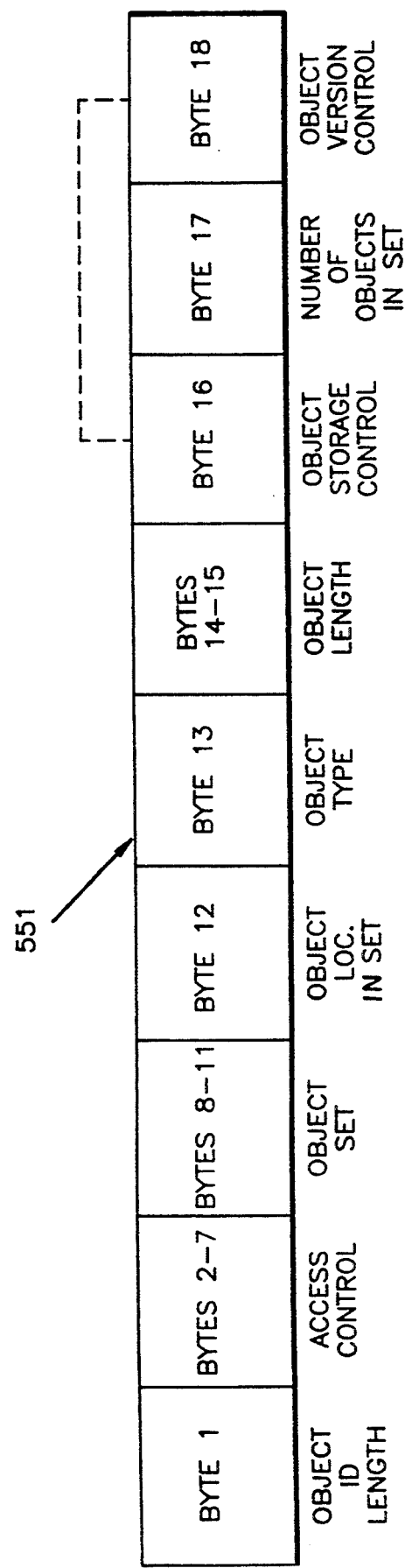
Figure 4C:
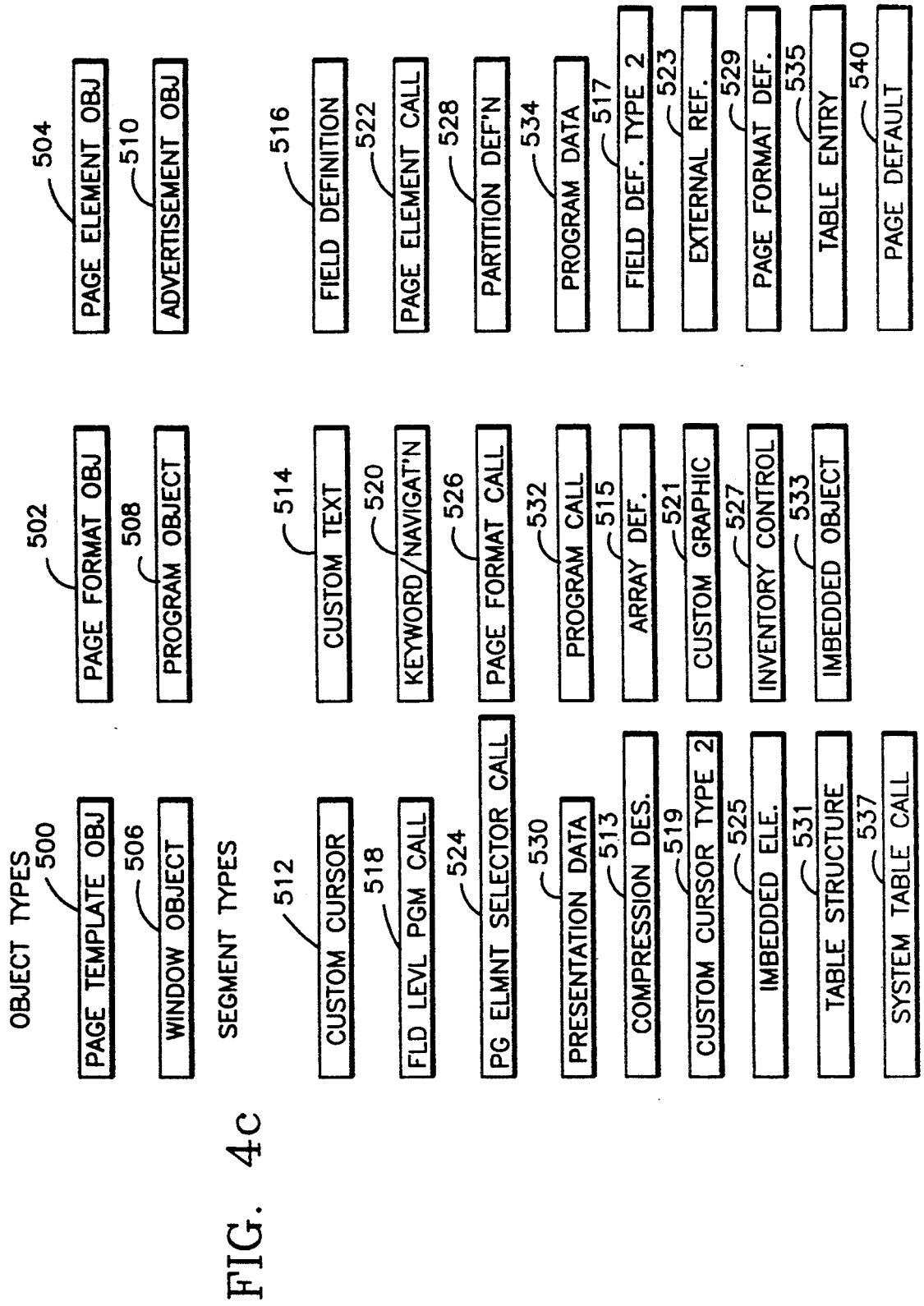
Figure 5:
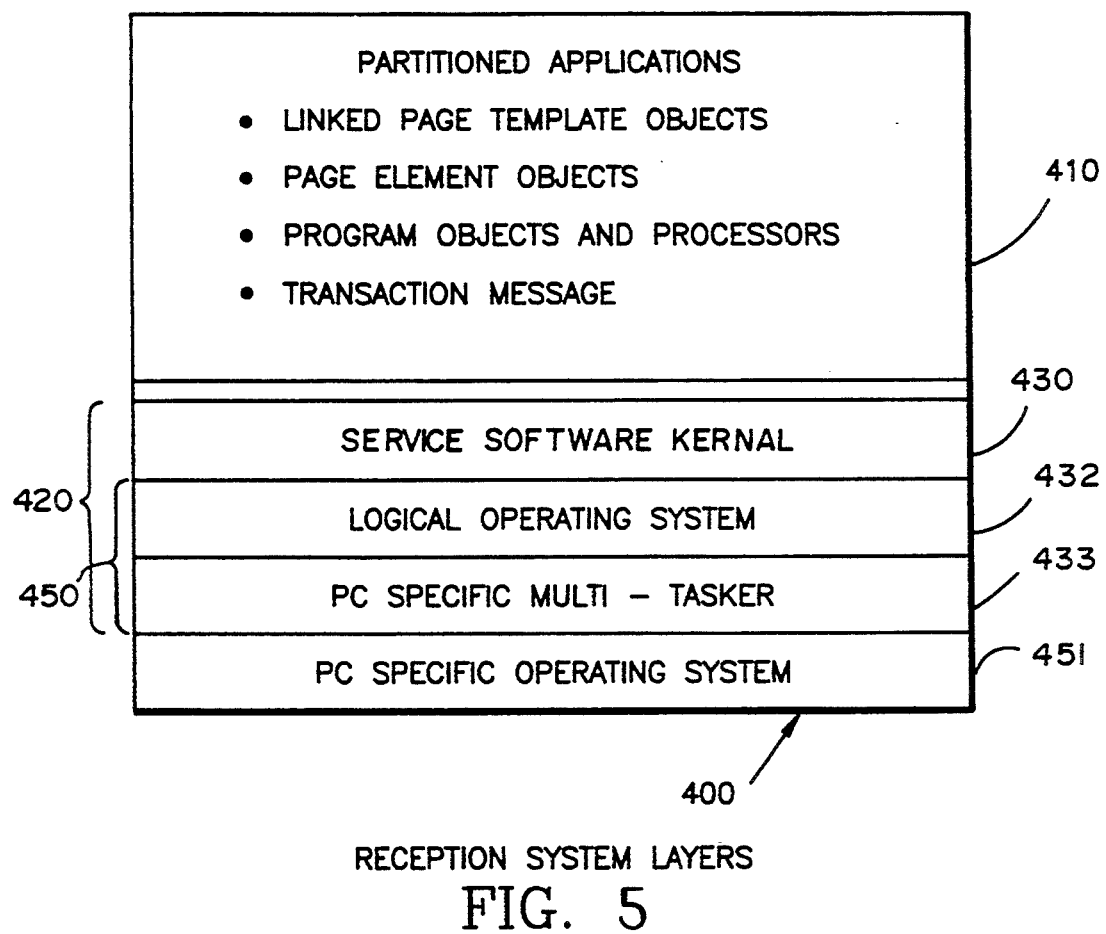
FIG. 5 is a schematic diagram that illustrates major layers for a reception system which might be used for supporting applications in a network in which the data-storage method of the present invention may be practiced.

As shown in FIG. 4c, the network objects are organized as a family of objects each of which perform a specific function in support of the interactive session. More particularly, the network object family is seen to include 6 members: page format objects 502, page element objects 504, window objects 506, program objects 508, advertisement objects 510 and page template objects 500.

Objects 500 to 510 shown in FIG. 4c are themselves made up of further sub-blocks of information that may be selectively collected to define the objects and resulting pages that ultimately constitute the application presented to the user in an interactive text and graphic session.

More specifically and as shown schematically in FIG. 4a, objects 500 to 510 are predefined, variable length records consisting of a fixed length header 551 and one or more self-defining record segments 552 a list of which is presented in FIG. 4c as segment types 512 to 540.

In accordance with this design, and as shown in FIG. 4b, object header 551 in preferred form is 18 bytes in length and contains a prescribed sequence of information which provides data regarding the object's identification, its anticipated use, association to other objects, its length and its version and currency.

More particularly, each of the 18 bytes of object header 551 are conventional hexadecimal, 8 bit bytes and are arranged in a fixed pattern to facilitate interpretation by network 10. Particularly, and as shown in FIG. 4b, the first byte of header 551; i.e., byte 1, identifies the length of the object ID in hexadecimal. The next six bytes; i.e., bytes 2 to 7, are allocated for identifying access control to the object so as to allow creation of closed user groups to whom the object(s) is to be provided. As will be appreciated by those skilled in the art, the ability to earmark objects in anticipation of user requests enables the network to anticipate requests and pre-collect objects from large numbers of them maintained to render the network more efficient and reduce response time. The following 4 bytes of header 551; bytes 8 to 11, are used to identify the set of objects to which the subject object belongs. In this regard, it will be appreciated that, again, for speed of access and efficiency of selection, the objects are arranged in groups or sets which are likely to be presented to user sequentially in presenting the page sets; i.e., screens that go to make up a session.

Following identification of the object set, the next byte in header 551; i.e., byte 12, gives the location of the subject object in the set. As will be appreciated here also the identification is provided to facilitate ease of object location and access among the many thousands of objects that are maintained to, thereby, render their selection and presentation more efficient and speedy.

Thereafter, the following byte of header 551; i.e., byte 13, designates the object type; e.g., page format, page template, page element, etc. Following identification of the object type, two bytes; i.e., bytes 14, 15, are allocated to define the length of the object, which may be of whatever length is necessary to supply the data necessary, and thereby provides great flexibility for creation of the screens. Thereafter, in accordance with the preferred form of the invention, a single byte; i.e., byte 16, is allocated to identify the storage characteristic for the object; i.e., the criterion which establishes at what level in network 10 the object will be stored, and the basis upon which it will be updated. At least a portion of this byte; i.e, the higher order nibble (first 4 bits reading from left to right) is associated with the last byte; i.e., byte 18, in the header which identifies the version of the object, a control used in determining how often in a predetermined period of time the object will be updated by the network.

Following storage characteristic byte 16, header 551 includes a byte; i.e., 17, which identifies the number of objects in the set to which the subject object belongs. Finally, and as noted above, in accordance with the invention, header 551 includes a byte; i.e., 18, which identifies the version of the object. Particularly the object version is a number to establish the control for the update of the object that are resident at RS 400.

As shown in FIG. 4a, and as noted above, in addition to header 551, the object includes one more of the various segment types shown in FIG. 4c.

Segments 512 to 540 are the basic building blocks of the objects. And, as in the case of the object, the segments are also self-defining. As will be appreciated by those skilled in the art, by making the segments self-defining, changes in the objects and their use in the network can be made without changing pre-existing objects.

As in the case of objects, the segments have also been provided with a specific structure. Particularly, and as shown in FIG. 4a, segments 552 consists of a designation of segment type 553, identification of segment length 554, followed by the information necessary to implement the segment and its associated object 555; e.g., either, control data, display data or program code.

In this structure, segment type 553 is identified with a one-byte hexadecimal code which describes the general function of the segment. Thereafter, segment length 554 is identified as a fixed two-byte long field which carries the segment length as a hexadecimal number in INTEL format; i.e., least significant byte first. Finally, data within segments may be identified either by position or keyword, depending on the specific requirements of the segment.

NETWORK MESSAGES

In addition to the network objects, and the display data, control data, and the program instructions they contain as previously described, network 10 also exchanges information regarding the support of user sessions and the maintenance of the network as "messenger". Specifically, messages typically relate to the exchange of information associated with initial logon of a reception system 400 to network 10, dialogue between RS 400 and other elements and communications by the other network elements amongst themselves.

To facilitate message exchange internally, and through gateway 210 to entities externally to network 10, a protocol termed the "Data Interchange Architecture" (DIA) is used to support the transport and interpretation of information. More particularly, DIA enables: communications between RS 400 units, separation of functions between network layers 100, 200, 300 and 401; consistent parsing of data; an "open" architecture for network 10; downward compatibility within the network; compatibility with standard industry protocols such as the IBM System Network Architecture; Open Systems Interconnections standard; support of network utility sessions; and standardization of common network and application return codes.

Thus DIA binds the various components of network 10 into a coherent entity by providing a common data stream for communications management purposes. DIA provides the ability to route messages between applications based in IBM System Network Architecture (SNA), (well known in the art, and more fully described in *Data and Computer communications*, by W. Stallings, Chapter 12, McMillian Publishing, Inc. (1985)) and non-SNA reception system applications; e.g. home computer applications. Further, DIA provides common data structure between applications run at RS 400 units and applications that may be run on external computer networks; e.g. Dow Jones Services, accessed through gateway 210. As well, DIA provides support for utility sessions between backbone applications run within network 10. A more detailed description of network messaging in provided in parent application Ser. No. 388,156 now issued Sep. 13, 1994 as U.S. Pat. No. 5,347,632, the contents of which patent are incorporated herein by reference.

OBJECT LANGUAGE

In accordance with the design of network 10, in order to enable the manipulation of the network objects, the application programs necessary to support the interactive text/graphic sessions are written in a high-level language referred to as "TBOL", (TRINTEX Basic Object Language, "TRINTEX" being the former company name of one of the assignees of this invention). TBOL is specifically adapted for writing the application programs so that the programs may be compiled into a compact data stream that can be interpreted by the application software operating in the user personal computer, the application software being designed to establish the network Reception System 400 previously noted and described in more detail hereafter.

The Reception System application software supports an interactive text/graphics sessions by managing objects. As explained above, objects specify the format and provide the content; i.e., the text and graphics, displayed on the user's screen so as to make up the pages that constitute the application. As also explained, pages are divided into separate areas called "partitions" by certain objects, while certain other objects describe windows which can be opened on the pages. Further, still other objects contain TBOL application programs which facilitate the data processing necessary to present the pages and their associated text and graphics.

As noted, the object architecture allows logical events to be specified in the object definitions. An example of a logical event is the completion of data entry on a screen; i.e., an application page. Logical events are mapped to physical events such as the user pressing the <ENTER> key on the keyboard. Other logical events might be the initial display of a screen page or the completion of data entry in a field. Logical events specified in page and window object definitions can be associated with the call of TBOL program objects.

RS 400 is aware of the occurrence of all physical events during the interactive text/graphic sessions. When a physical event such as depression of the forward <TAB> key corresponds to a logical event such as completion of data entry in a field, the appropriate TBOL program is executed if specified in the object definition. Accordingly, the TBOL programs can be thought of as routines which are given control to perform initialization and post-processing application logic associated with the fields, partitions and screens at the text/graphic sessions.

RS 400 run time environment uses the TBOL programs and their high-level key-word commands called verbs to provide all the system services needed to support a text/graphic session, particularly, display management, user input, local and remote data access.

TBOL programs have a structure that includes three sections: a header section in which the program name is specified; a data section in which the data structure the program will use are defined; and a code section in which the program logic is provided composed of one or more procedures. More specifically, the code section procedures are composed of procedure statements, each of which begins with a TBOL key word called a verb.

The name of a procedure can also be used as the verb in a procedure statement exactly as if it were a TBOL key-word verb. This feature enables a programmer to extend the language vocabulary to include customized application-oriented verb commands.

Continuing, TBOL programs have a program syntax that includes a series of "identifiers" which are the names and labels assigned to programs, procedures, and data structures.

An identifier may be up to 31 characters long; contain only uppercase or lowercase letters A through Z, digits 0 through 9, and/or the special character underscore ( ); and must begin with a letter. Included among the system identifiers are: "header section identifiers" used in the header section for the program name; "data section identifiers" used in the data section for data structure names, field names and array names; and finally, "code section identifiers" used in the code section for identification of procedure names and statement labels. A more detailed description of TBOL is provided in parent application Ser. No. 388,156 issued Sep. 13, 1994 as U.S. Pat. No. 5,347,632, the contents of which patent are incorporated herein by reference.

RECEPTION SYSTEM SOFTWARE

The reception system 400 software is the interface between the user of personal computer 405 and interactive network 10. The object of reception system software is to minimize mainframe processing, minimize transmission across the network, and support application extendibility and portability.

RS 400 software is composed of several layers, as shown in FIG. 7. It includes external software 451, which is composed of elements well known to the art such as device drivers, the native operating systems; e.g., MS-DOS, machine-specific assembler functions (in the preferred embodiment; e.g., CRC error checking), and "C" runtime library functions; native software 420; and partitioned applications 410.

Again with reference to FIG. 7, native software 420 is compiled from the "C" language into a target machine-specific executable, and is composed of two components: the service software 430 and the operating environment 450. Operating environment 450 is comprised of the Logical Operating System 432, or LOS; and a multitasker 433. Service software 430 provides functions specific to providing interaction between the user and interactive network 10, while the operating environment 450 provides pseudo multitasking and access to local physical resources in support of service software 430. Both layers of native software 420 contain kernel, or device independent functions 430 and 432, and machine-specific or device dependent functions 433. All device dependencies are in code resident at RS 400, and are limited to implementing only those functions that are not common across machine types, to enable interactive network 10 to provide a single data stream to all makes of personal computer which are of the IBM or IBM compatible type. Source code for the native software 420 is included in parent application Ser. No. 388,156 now issued as U.S. Pat. No. 5,347,632, the contents of which patent are incorporated herein by reference. Those interested in a more detailed description of the reception system software may refer to the source code provided in the referenced patent.

Service software 430 is comprised of modules, which are device-independent software components that together obtain, interpret and store partitioned applications existing as a collection of objects. The functions performed by, and the relationship between, the service software 430 module is shown in FIG. 8 and discussed further below.

Through facilities provided by LOS 432 and multitasker 433, here called collectively operating environment 450, device-independent multitasking and access to local machine resources, such as multitasking, timers, buffer management, dynamic memory management, file storage and access, keyboard and mouse input, and printer output are provided. The operating environment 450 manages communication and synchronization of service software 430, by supporting a request/response protocol and managing the interface between the native software 420 and external software 437.

Applications software layer 410 consists of programs and data written in an interpretive language, "TRINTEX Basic Object Language" or "TBOL," described above. TBOL was written specifically for use in RS 400 and interactive network 10 to facilitate videotext-specific commands and achieve machine-independent compiling. TBOL is constructed as objects, which in interaction with one another comprise partitioned applications.

RS native software 420 provides a virtual machine interface for partitioned applications, such that all objects comprising partitioned applications "see" the same machine. RS native software provides support for the following functions: (1) keyboard and mouse input; (2) text and graphics display; (3) application interpretation; (4) application database management; (5) local application storage; (6) network and link level communications; (7) user activity data collection; and (8) advertisement management.

With reference to FIG. 8, service software 430 is comprised of the following modules: start-up (not shown); keyboard manger 434; object interpreter 435; TBOL interpreter 438; object storage facility 439; display manager 461; data collection manager 441; ad manager 442; object/communications manager interface 443; link communications manager 444; and fatal error manager 469. Each of these modules has responsibility for managing a different aspect of RS 400.

Startup reads RS 400 customization options into RAM, including modem, device driver and telephone number options, from the file CONFIG.SM. Startup invokes all RS 400 component startup functions, including navigation to the first page, a logon screen display containing fields initialized to accept the user's id and password. Since Startup is invoked only at initialization, for simplicity, it has not been shown in FIG. 8.

The principal function of keyboard manger 434 is to translate personal computer dependent physical input into a consistent set of logical keys and to invoke processors associated with these keys. Depending on the LOS key, and the associated function attached to it, navigation, opening of windows, and initiation of filter or post-processor TBOL programs may occur as the result input events handled by the keyboard manger 434. In addition, keyboard manger 434 determines inter and intra field cursor movement, and coordinates the display of field text and cursor entered by the user with display manager 461, and sends information regarding such inputs to data collection manager 441.

Object interpreter 435 is responsible for building and recursively processing a table called the "Page Processing Table," or PPT. Object interpreter 435 also manages the opening and closing of windows at the current page. Object interpreter 435 is implemented as two sub-components: the object processor 436 and object scanner 437.

Figure 6:
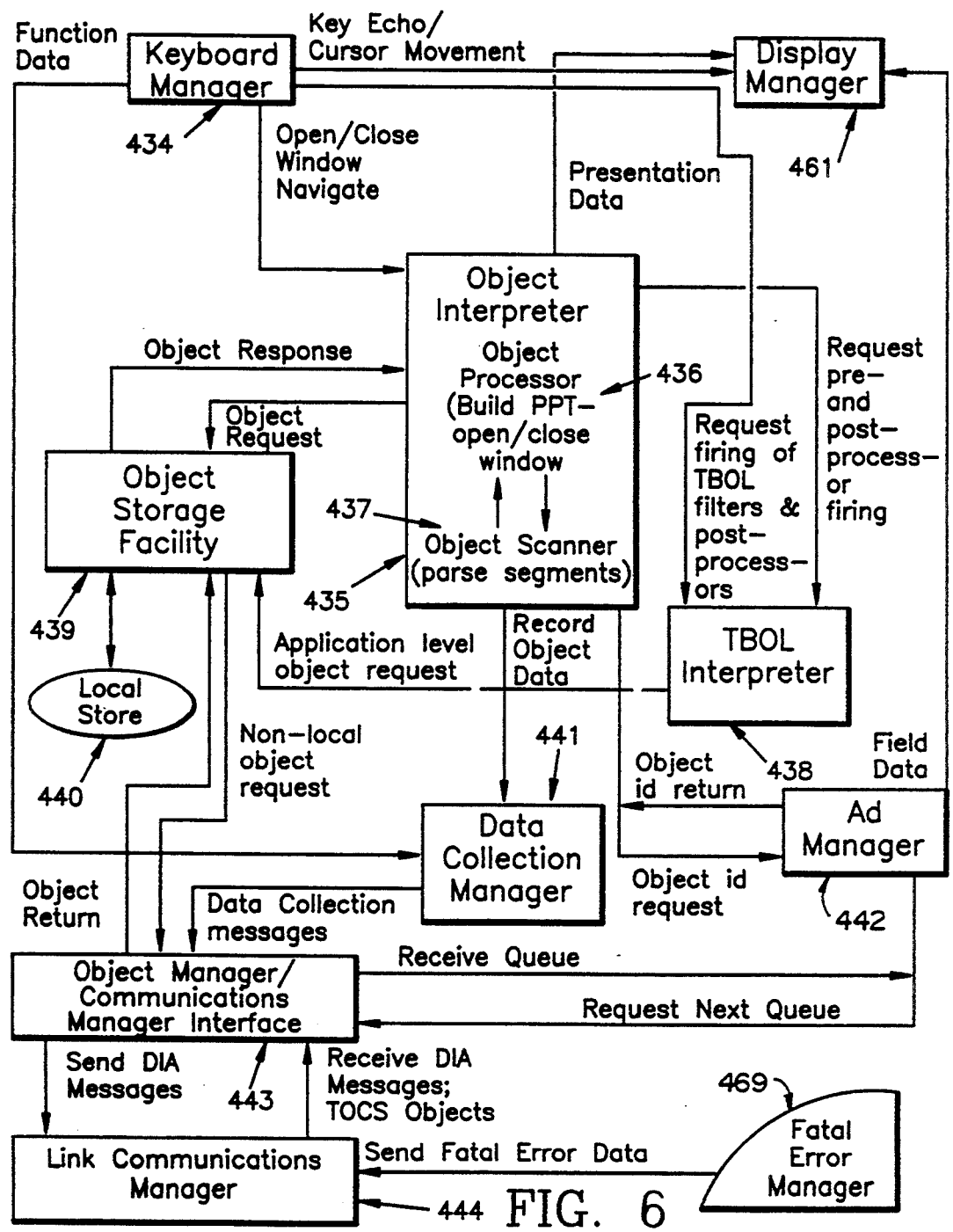
FIG. 6 is a block diagram that illustrates native code modules for a reception system which might be used for supporting applications in a network in which the data-storage method of the present invention may be practiced.

Object processor 436 provides an interface to keyboard manger 434 for navigation to new pages, and for opening and closing windows in the current page. Object processor 436 makes a request to object storage facility 439 for a page template object (PTO) or window object (WO), as requested by keyboard manger 434, and for objects and their segments which comprise the PTO or WO returned by object storage facility 439 to object processor 436. Based on the particular segments comprising the object(s) making up the new PTO or WO, object processor 436 builds or adds to the page processing table (PPT), which is an internal, linked-list, global data structure reflecting the structure of the page or page format object (PFO), each page partition or page element object (PEO), and program objects (POs) required and each window object (WO) that could be called. Objects are processed by parsing and interpreting each object and its segment(s) according to their particular structure as formalized in the data object architecture (DOA). While in the process object state, (state "B" of FIG. 6), object processor 436 will request any objects specified by the PTO that are identified by external references in call segments (e.g. field level program call 518, page element selector call 524, page format call 526 program call 532, page element call 522 segments) of such objects, and will, through a request to TBOL interpreter 438, fire initializers and selectors contained in program data segments of all PTO constituent program objects, at the page, element, and field levels. Object processor 436 requests all objects required to build a page, except objects that could only be called as the result of some event external to the current partitioned application, such as a HELP window object. When in the course of building or adding to the PPT and opening/closing WOs, object processor encounters a call to an "ADSLOT" object id, the next advertisement object id at ad manager 442 is fetched, and the identified advertisement object is retrieved either locally, if available, or otherwise from the network, so that the presentation data for the advertisement can be sent to display manager 461 along with the rest of the presentation data for the other objects to enable display to the user. Object processor 436 also passes to data collection manager 441 all object ids that were requested and object ids that were viewed. Upon completion of page or window processing, object processor 436 enters the wait for event state, and control is returned to keyboard manger 434.

The second component of object interpreter 435, object scanner 437, provides a file-like interface, shared with object storage facility 439, to objects currently in use at RS 400, to enable object processor 436 to maintain and update the PPT. Through facilities provided by object scanner 437, object processor recursively constructs a page or window in the requested or current partitioned application, respectively.

In accordance with the invention, object storage facility 439 provides an interface through which object interpreter 435 and TBOL interpreter 438 either synchronously request (using the TBOL verb operator "GET" ) objects without which processing in either module cannot continue, or asynchronously request (using the TBOL verb operator "FETCH") objects in anticipation of later use. Object storage facility 439 returns the requested objects to the requesting module once retrieved from either local store 440 or interactive network 10. Through control structures shared with the object scanner 437, object storage facility determines whether the requested object resides locally, and if not, makes an attempt to obtain it from interactive network 10 through interaction with link communications manager 444 via object/communications manager interface 443.

When objects are requested from object storage facility 439, only the latest version of the object will be provided to guarantee currency of information to the user. Object storage facility 439 assures currency by requesting version verification from network 10 for those objects which are available locally and by requesting objects which are not locally available from delivery system 20 where currency is maintained.

Version verification increases response time. Therefore, not all objects locally available are version checked each time they are requested. Typically, objects are checked only the first time they are requested during a user session. However, there are occasions, as for example in the case of objects relating to news applications, where currency is always checked to assure integrity of the information.

The frequency with which the currency of objects is checked depends on factors such as the frequency of updating of the objects. For example, objects that are designated as ultrastable in a storage control parameter in the header of the object are never version checked unless a special version control object sent to the RS as part of logon indicates that all such objects must be version checked. Object storage facility 439 marks all object entries with such a stability category in all directories indicating that they must be version checked the next time they are requested.

Object storage facility 439 manages objects locally in local store 440, comprised of a cache (segmented between available RAM and a fixed size disk file), and stage (fixed size disk file). Ram and disk cached objects are retained only during user sessions, while objects stored in the stage file are retained between sessions. The storage control field, located in the header portion of an object, described more fully hereafter as the object "storage candidacy", indicates whether the object is stageable, cacheable or trashable.

Stageable objects must not be subject to frequent change or update. They are retained between user sessions on the system, provided storage space is available and the object has not discarded by a least-recently-used (LRU) algorithm of a conventional type; e.g., see *Operating System Theory*, by Coffman, Jr. and Denning, Prentice Hall Publishers, New York, 1973, which in accordance with the invention, operates in combination with the storage candidacy value to determine the object storage priority, thus rendering the stage self-configuring as described more fully hereafter. Over time, the self-configuring stage will have the effect of retaining within local disk storage those objects which the user has accessed most often. The objects retained locally are thus optimized to each individual user's usage of the applications in the system. Response time to such objects is optimized since they need not be retrieved from the interactive computer system.

Cacheable objects can be retained during the current user session, but cannot be retained between sessions. These objects usually have a moderate update frequency. Object storage facility 439 retains objects in the cache according to the LRU storage retention algorithm. Object storage facility 439 uses the LRU algorithm to ensure that objects that are least frequently used forfeit their storage to objects that are more frequently used.

Trashable objects can be retained only while the user is in the context of the partitioned application in which the object was requested. Trashable objects usually have a very high update frequency and must not be retained to ensure that the user has access to the most current data.

More particularly and, as noted above, in order to render a public informational and transactional network of the type considered here attractive, the network must be both economical to use and fast. That is to say, the network must supply information and transactional support to the user at minimal costs and with a minimal response time. In accordance with the present invention, these objectives are sought to be achieved by locating as many information and transactional support objects which the user is likely to request, as close to the user as possible; i.e., primarily at the user's RS 400 and secondarily at delivery system 20. In this way, the user will be able to access objects required to support a desired application with minimal intervention of delivery system 20, thus reducing the cost of the session and speeding the response time.

However, the number of objects that can be maintained at RS 400 is restricted by at least two factors: the RS 400 storage capacity; i.e., RAM and disk sizes, and the need to maintain the stored objects current.

In order to optimize the effectiveness of the limited storage space at RS 400, the collection of objects is restricted to those likely to be requested by the user; i.e., tailored to the user's tastes—and to those least likely to be time sensitive; i.e., objects which are stable. To accomplish this, objects are coded for storage candidacy to identify when they will be permitted at RS 400, and subject to the LRU algorithm to maintain presence at RS 400. Additionally, to assure currency of the information and transaction support provided at RS 400, objects are further coded for version identification and checking in accordance with a system of priorities that are reflected in the storage candidacy coding.

Specifically, to effect object storage management, objects are provided with a coded version id made up of the storage control byte and version control bytes identified above as elements of the object header, specifically, bytes 16 and 18 shown in FIG. 4b. In preferred form, the version id is comprised of bytes 16 and 18 to define two fields, a first 13 bit field to identify the object version and a second three bite field to identify the object storage candidacy.

In this arrangement, the storage candidacy value of the object is addressed to not only the question of storage preference but also object currency. Specifically, the storage candidacy value establishes the basis upon which the object will be maintained at RS 400 and also identifies the susceptibility of the object to becoming stale by dictating when the object will be version checked to determine currency.

The version value of the object on the other hand, provides a parameter that can be checked against predetermined values available from delivery system 20 to determine whether an object stored at RS 400 is sufficiently current to permit its continued use, or whether the object has become stale and needs to be replaced with a current object from delivery system 20.

Still further, object storage management procedure further includes use of the LRU algorithm, for combination with the storage and version coding to enable discarding of objects which are not sufficiently used to warrant retention, thus personalizing the store of objects at RS 400 to the user's tastes. Particularly, object storage facility 439, in accordance with the LRU algorithm maintains a usage list for objects. As objects are called to support the user's applications requests, the objects are moved to the top of a usage list. As other objects are called, they push previously called objects down in the list. If an object is pushed to the bottom of the list before being recalled, it will be forfeited from the list if necessary to make room for the next called object. As will be appreciated, should a previously called object be again called before it is displaced from the list, it will be promoted to the top of the list, and once more be subject to depression in the list and possible forfeiture as other objects are called.

As pointed out above, in the course of building the screens presented to the user, objects will reside at various locations in RS 400. For example, objects may reside in the RS 400 RAM where the object is supporting a particular application screen then running or in a cache maintained at either RAM or disk 424 where the object is being held for an executing application or staged on the fixed size file on disk 424 noted above where the object is being held for use in application likely to be called by the user in the future.

In operation, the LRU algorithm is applied to all these regions and serves to move an object from RAM cache to disk cache to disk file, and potentially off RS 400 depending on object usage.

With regard to the storage candidacy value, in this arrangement, the objects stored at RS 400 include a limited set of permanent objects; e.g., those supporting logon and logoff, and other non-permanent objects which are subject to the LRU algorithm to determine whether the objects should be forfeited from RS 400 as other objects are added. Thus, in time, and based on the operation of the LRU algorithm and the storage candidacy value, the collection of objects at RS 400 will be tailored to the usage characteristics of the subscriber; i.e., self-configuring.

More particularly, the 3-bit field of the version id that contains the storage candidacy parameter can have 8 different values. A first candidacy value is applied where the object is very sensitive to time; e.g., news items, volatile pricing information such as might apply to stock quotes, etc. In accordance with this first value, the object will not be permitted to be stored on RS 400, and RS 400 will have to request such objects from delivery system 20 each time it is accessed, thus, assuring currency. A second value is applied where the object is sensitive to time but less so than the first case; e.g., the price of apples in a grocery shopping application. Here, while the price might change from day to day, it is unlikely to change during a session. Accordingly the object will be permitted to persist in RAM or at the disk cache during a session, but will not be permitted to be maintained at RS 400 between sessions.

Continuing down the hierarchy of time sensitivity, where the object concerns information sufficiently stable to be maintained between sessions, a third storage candidacy value is set to permit the object to be stored at RS 400 between sessions, on condition that the object will be version check the first time it is accessed in a subsequent session. As will be appreciated, during a session, and under the effect of the LRU algorithm, lack of use at RS 400 of the object may result in it being forfeited entirely to accommodate new objects called for execution at RS 400.

Still further, a fourth value of storage candidacy is applied where the object is considered sufficiently stable as not to require version checking between sessions; e.g., objects concerning page layouts not anticipated to change. In this case, the storage candidacy value may be encoded to permit the object to be retained from session to session without version checking. Here again, however, the LRU algorithm may cause the object to forfeit its storage for lack of use.

Where the object is of a type required to be stored at RS 400, as for example, objects needed to support standard screens, it is coded for storage between sessions and not subject to the LRU algorithm forfeiture. However, where such objects are likely to change in the future they may be required to be version checked the first time they are accessed in a session and thus be given a fifth storage candidacy value. If, on the other hand, the required stored object is considered likely to be stable and not require even version checking; e.g., logon screens, it will be coded with a sixth storage candidacy value for storage without version checking so as to create a substantially permanent object.

Continuing, where a RS 400 includes a large amount of combined RAM and disk capacity, it would permit more objects to be stored. However, if objects were simply coded in anticipation of the larger capacity, the objects would potentially experience difficulty, as for example, undesired forfeiture due to capacity limitations if such objects were supplied to RS 400 units having smaller RAM and disk sizes. Accordingly, to take advantage of the increased capacity of certain RS 400 units without creating difficulty in lower capacity units, objects suitable for storage in large capacity units can be so coded for retention between sessions with a seventh and eighth storage candidacy value depending upon whether the stored large capacity object requires version checking or not. Here, however, the coding will be interpreted by smaller capacity units to permit only cacheable storage to avoid undesirable forfeiture that might result from over filling the smaller capacity units.

Where an object is coded for no version checking need may nonetheless arise for a version check at some point. To permit version checking of such objects, a control object is provided at RS 400 that may be version checked on receipt of a special communication from delivery system 20. If the control object fails version check, then a one shot version checking attribute is associated with all existing objects in RS 400 that have no version checking attributes. Thereafter, the respective objects are version checked, the one shot check attribute is removed and the object is caused to either revert to its previous state if considered current or be replaced if stale.

Still further, objects required to be stored at RS 400 which are not version checked either because of lack of requirement or because of no version check without a control object, as described above, can accumulate in RS 400 as dead objects. To eliminate such accumulation, all object having required storage are version checked over time. Particularly, the least recently used required object is version checked during a session thus promoting the object to the top of the usage list if it is still to be retained at RS 400. Accordingly, one such object will be checked per session and over time, all required objects will be version checked thereby eliminating the accumulation of dead objects.

However, in order to work efficiently, the version check attribute of the object should be ignored, so that even required object can be version checked. Yet, in certain circumstances, e.g., during deployment of new versions of the reception system software containing new objects not yet supported on delivery system 20 which may be transferred to the fixed storage file of RS 400 when the new version is loaded, unconditional version checking may prematurely deletes the object from the RS 400 as not found on delivery system 20. To avoid this problem, a sweeper control segment in the control object noted above can be used to act as a switch to turn the sweep of dead objects on and off.

With respect to version checking for currency, where an object stored at RS 400 is initially fetched or accessed during a session, a request to delivery system 20 is made for the object by specifying the version id of the object stored at RS 400.

In response, delivery system 20 will advise the reception system 400 either that the version id of the stored object matches the currency value; i.e., the stored object is acceptable, or deliver a current object that will replace the stored object shown to be stale. Alternatively, the response may be that the object was not found. If the version of the stored object is current, the stored object will be used until verified again in accordance with its storage candidacy. If the stored object is stale, the new object delivered will replace the old one and support the desired screen. If the response is object not found, the stored object will be deleted.

Therefore, based on the above description, network 10 is seen to include steps for execution at storage facility 439 which enables object reception, update and deletion by means of a combination of operation of the LRU algorithm and interpretation of the storage candidacy and version control values. In turn, these procedures cooperate to assure a competent supply of objects at RS 400 so as to reduce the need for intervention of delivery system 20, thus reducing cost of information supply and transactional support so as to speed the response to user requests.

TBOL interpreter 438 shown in FIG. 8 provides the means for executing program objects, which have been written using an interpretive language, TBOL described above. TBOL interpreter 438 interprets operators and operand contained in program object 508, manages TBOL variables and data, maintains buffer and stack facilities, and provides a runtime library of TBOL verbs.

TBOL verbs provide support for data processing, program flow control, file management, object management, communications, text display, command bar control, open/close window, page navigation and sound. TBOL interpreter also interacts with other native modules through commands contained in TBOL verbs. For example: the verb "navigate" will cause TBOL interpreter 438 to request object interpreter 435 to build a PPT based on the PTO id contained in the operand of the NAVIGATE verb; "fetch" or "GET" will cause TBOL interpreter 438 to request an object from object storage facility 439; "SET FUNCTION" will assign a filter to events occurring at the keyboard manger 434; and "FORMAT " "SEND" and "RECEIVE" will cause TBOL interpreter 438 to send application level requests to object/communications manager interface 433.

Data areas managed by TBOL interpreter 438 and available to TBOL programs are Global External Variables (GEVs), Partition External Variables (PEVs), and Runtime Data Arrays (RDAs).

GEVs contain global and system data, and are accessible to all program objects as they are executed. GEVs provide a means by which program objects may communicate with other program objects or with the RS native code, if declared in the program object. GEVs are character string variables that take the size of the variables they contain. GEVs may preferably contain a maximum of 32,000 variables and are typically used to store such information as program return code, system date and time, or user sex or age. TBOL interpreter 438 stores such information in GEVs when requested by the program which initiated a transaction to obtain these records from the RS or user's profile stored in the interactive system.

Partition external variables (PEVs) have a scope restricted to the page partition on which they are defined. PEVs are used to hold screen field data such that when PEOs and window objects are defined, the fields in the page partitions with which these objects are to be associated are each assigned to a PEV. When applications are executed, TBOL interpreter 438 transfers data between screen fields and their associated PEV. When the contents of a PEV are modified by user action or by program direction, TBOL interpreter 428 makes a request to display manager 461 to update the screen field to reflect the change. PEVs are also used to hold partition specific application data, such as tables of information needed by a program to process an expected screen input.

Because the scope of PEVs is restricted to program objects associated with the page partition in which they are defined, data that is to be shared between page partitions or is to be available to a page-level processor must be placed in GEVs or RDAs.

RDAs are internal stack and save buffers used as general program work areas. RDAs are dynamically defined at program object "runtime" and are used for communication and transfer of data between programs when the data to be passed is not amenable to the other techniques available. Both GEVs and RDAs include, in the preferred embodiment, 8 integer registers and 8 decimal registers. Preferably, there are also 9 parameter registers limited in scope to the current procedure of a program object.

All variables may be specified as operand of verbs used by the virtual machine. The integer and decimal registers may be specified as operand for traditional data processing. The parameter registers are used for passing parameters to "called" procedures. The contents of these registers are saved on an internal program stack when a procedure is called, and are restored when control returns to the "calling" procedure from the "called" procedure.

TBOL interpreter 438, keyboard manger 434, object interpreter 435, and object storage facility 439, together with device control provided by operating environment 450, have principal responsibility for the management and execution of partitioned applications at the RS 400. The remaining native code modules function in support and ancillary roles to provide RS 400 with the ability display partitioned applications to the user (display manager 461), display advertisements (ad manager 442), to collect usage data for distribution to interactive network 10 for purposes of targeting such advertisements (data collection manager 441), and prepare for sending, and send, objects and messages to interactive network 10 (object/communications manager interface 443 and link communications manager 444) Finally, the fatal error manager exists for one purpose: to inform the user of RS 400 and transmit to interactive network 10 the inability of RS 400 to recover from a system error.

Display manager 461 interfaces with a decoder using the North American Presentation Level Protocol Syntax (NAPLPS), a standard for encoding graphics data, or text code, such as ASCII, which are displayed on monitor 412 of the user's personal computer 405 as pictorial codes. Codes for other presentation media, such as audio, can be specified by using the appropriate type code in the presentation data segments. Display manager 461 supports the following functions: send NAPLPS strings to the decoder; echo text from a PEV; move the cursor within and between fields; destructive or non-destructive input field character deletion; "ghost" and "unghost" fields (a ghosted field is considered unavailable, unghosted available); turn off or on the current field cursor; open, close, save and restore bit maps for a graphics window; update all current screen fields by displaying the contents of their PEVs, reset the NAPLPS decoder to a known state; and erase an area of the screen by generating and sending NAPLPS to draw a rectangle over that area. Display manager 461 also provides a function to generate a beep through an interface with a machine-dependent sound driver.

Ad manager 442 is invoked by object interpreter 435 to return the object id of the next available advertisement to be displayed. Ad manager 442 maintains a queue of advertising object id's targeted to the specific user currently accessing interactive network 10. Advertising objects are pre-fetched from interactive system 10 from a personalized queue of advertising ids that is constructed using data previously collected from user generated events and/or reports of objects used in the building of pages or windows, compiled by data collection manager 466 and transmitted to interactive system 10.

Advertising objects 510 are PEOs that, through user invocation of a "LOOK" command, cause navigation to partitioned applications that may themselves support, for example, ordering and purchasing of merchandise.

An advertising object id list, or "ad queue," is requested in a transaction message to delivery system 20 by ad manager 442 immediately after the initial logon response. The logon application at RS 400 places the advertising list in a specific RS global storage area called a SYS GEV (system global external variable), which is accessible to all applications as well as to the native RS code). The Logon application also obtains the first two ad object id's from the queue and provides them to object storage facility 439 so the advertising objects can be requested. However, at logon, since no advertising objects are available at RS local storage facilities 440, ad objects, in accordance with the described storage candidacy, not being retained at the reception system between sessions, they must be requested from interactive network 10.

In accordance with the preferred form of network 10, the following parametric values are established for ad manager 442: advertising object is queue capacity, replenishment threshold for advertising object id's and replenishment threshold for number of outstanding pre-fetched advertising objects. These parameters are set up in GEVs of the RS virtual machine by the logon application program object from the logon response from high function system 110. The parameters are then also accessible to the ad manager 442. Preferred values are an advertising queue capacity of 15, replenishment value of 10 empty queue positions and a pre-fetched advertising object threshold of 3.

Ad manager 442 pre-fetches advertising objects by passing advertising object id's from the advertising queue to object storage facility 439 which then retrieves the object from the interactive system if the object is not available locally. Advertising objects are pre-fetched, so they are available in RS local store 440 when requested by object interpreter 435 as it builds a page. The ad manager 442 pre-fetches additional advertising objects whenever the number of pre-fetched advertising objects not called by object interpreter 435; i.e. the number of remaining advertising objects, falls below the pre-fetch advertising threshold.

Whenever the advertising object id queue has more empty positions than replenishment threshold value, a call is made to the advertising object id queue application in high function system 110 shown in FIG. 2, via object/communications manager interface 443 for a number of advertising object id's equal to the threshold value. The response message from system 110 includes a list of advertising object id's, which ad manager 442 enqueues.

Object interpreter 435 requests the object id of the next advertising object from ad manager 442 when object interpreter 435 is building a page and encounters an object call for a partition and the specified object-id equals the code word, "ADSLOT." If this is the first request for an advertising object id that ad manager 442 has received during this user's session, ad manager 442 moves the advertising object id list from the GEV into its own storage area, which it uses as an advertising queue and sets up its queue management pointers, knowing that the first two advertising objects have been pre-fetched.

Ad manager 442 then queries object storage facility 439, irrespective of whether it was the first request of the session. The query asks if the specified advertising object id pre-fetch has been completed, i.e., is the object available locally at the RS. If the object is available locally, the object-id is passed to object interpreter 435, which requests it from object storage facility 439. If the advertising object is not available in local store 440, ad manager 442 attempts to recover by asking about the next ad that was pre-fetched. This is accomplished by swapping the top and second entry in the advertising queue and making a query to object storage facility 439 about the new top advertising object id. If that object is not yet available, the top position is swapped with the third position and a query is made about the new top position.

Besides its ability to provide advertising that have been targeted to each individual user, two very important response time problems have been solved by ad manager 442 of the present invention. The first is to eliminate from the new page response time the time it takes to retrieve an advertising object from the host system. This is accomplished by using the aforementioned pre-fetching mechanism.

The second problem is caused by pre-fetching, which results in asynchronous concurrent activities involving the retrieval of objects from interactive system 10. If an advertising object is pre-fetched at the same time as other objects required for a page are requested, the transmission of the advertising object packets could delay the transmission of the other objects required to complete the current page by the amount of time required to transmit the advertising object(s). This problem is solved by the structuring the requests from object interpreter 435 to the ad manager 442 in the following way:

1. Return next object id of pre-fetched advertising object & pre-fetch another;
2. Return next advertising object id only; and
3. Pre-fetch next advertising object only.

By separating the function request (1) into its two components, (2) and (3), object interpreter 435 is now able to determine when to request advertising object id's and from its knowledge of the page build process, is able to best determine when another advertising object can be pre-fetched, thus causing the least impact on the page response time. For example, by examining the PPT, object interpreter 435 may determine whether any object requests are outstanding. If there are outstanding requests, advertising request type 2 would be used. When all requested objects are retrieved, object interpreter 435 then issues an advertising request type 3. Alternatively, if there are no outstanding requests, object interpreter 435 issues an advertising request type 1. This typically corresponds to the user's "think time" while examining the information presented and when RS 400 is in the Wait for Event state (D).

Data collection manager 441 is invoked by object interpreter 435 and keyboard manger 434 to keep records about what objects a user has obtained (and, if a presentation data segment 530 is present, seen) and what actions users have taken (e.g. "NEXT," "BACK " "LOOK," etc.)

The data collection events that are to be reported during the user's session are sensitized during the logon process. The logon response message carries a data collection indicator with bit flags set to "on" for the events to be reported. These bit flags are enabled (on) or disabled (off) for each user based on information contained in the user's profile stored and sent from high function host 110. A user's data collection indicator is valid for the duration of his session. The type of events to be reported can be changed at will in the host data collection application. However, such changes will affect only users who logon after the change.

Data collection manager 441 gathers information concerning a user's individual system usage characteristics. The types of informational services accessed, transactions processed, time information between various events, and the like are collected by data collection manager 441, which compiles the information into message packets (not shown). The message packets are sent to network 10 via object/communication manager interface 443 and link communications manager 444. Message packets are then stored by high function host 110 and sent to an offline processing facility for processing. The characteristics of users are ultimately used as a means to select or target various display objects, such as advertising objects, to be sent to particular users based on consumer marketing strategies, or the like, and for system optimization.

Object/communications manager interface 443 is responsible for sending and receiving DIA (Data Interchange Architecture described above) formatted messages to or from interactive network 10. Object/communications manager 443 also handles the receipt of objects, builds a DIA header for messages being sent and removes the header from received DIA messages or objects, correlates requests and responses, and guarantees proper block sequencing. Object/communications manager interface 443 interacts with other native code modules as follows: object/communications manager 443 (1) receives all RS 400 object requests from object storage facility 439, and forwards objects received from network 10 via link communications manager 444 directly to the requesting modules; (2) receives ad list requests from ad manager 442, which thereafter periodically calls object/communications manager 443 to receive ad list responses; (3) receives data collection messages and send requests from data collection manager 441; (4) receives application-level requests from TBOL interpreter 438, which also periodically calls object/communications manager interface 443 to receive responses (if required); and (5) receives and sends DIA formatted objects and messages from and to link communications manager 444.

Object/communications manager interface 443 sends and receives DIA formatted messages on behalf of TBOL interpreter 438 and sends object requests and receives objects on behalf of object storage facility 439. Communication packets received containing parts of requested objects are passed to object storage facility 439 which assembles the packets into the object before storing it. If the object was requested by object interpreter 435, all packets received by object storage facility 439 are also passed to object interpreter 435 avoiding the delay required to receive an entire object before processing the object. Objects which are pre-fetched are stored by object storage facility 439.

Messages sent to interactive network 10 are directed via DIA to applications in network 10. Messages may include transaction requests for records or additional processing of records or may include records from a partitioned application program object or data collection manager 441. Messages to be received from network 10 usually comprise records requested in a previous message sent to network 10. Requests received from object storage facility 439 include requests for objects from storage in interactive system 10. Responses to object requests contain either the requested object or an error code indicating an error condition.

Object/communications manager 443 is normally the exclusive native code module to interface with link communications manager 444 (except in the rare instance of a fatal error). Link communications manager 444 controls the connecting and disconnecting of the telephone line, telephone dialing, and communications link data protocol. Link communications manager 444 accesses network 10 by means of a communications medium (not shown) link communications manager 444, which is responsible for a dial-up link on the public switched telephone network (PSTN). Alternatively, other communications means, such as cable television or broadcast media, may be used. Link communications manager 444 interfaces with TBOL interpreter for connect and disconnect, and with interactive network 10 for send and receive.

Link communications manager 444 is subdivided into modem control and protocol handler units. Modem control (a software function well known to the art) hands the modem specific handshaking that occurs during connect and disconnect. Protocol handler is responsible for transmission and receipt of data packets using the TCS (TRINTEX Communications Subsystem) protocol (which is a variety of OSI link level protocol, also well known to the art).

Fatal error manager 469 is invoked by all reception system components upon the occurrence of any condition which precludes recovery. Fatal error manager 469 displays a screen to the user with a textual message and an error code through display manager 461. Fatal error manager 469 sends an error report message through the link communications manager 444 to a subsystem of interactive network 10.

The source code for the reception system software as noted above is described in parent application Ser. No. 388,156 filed Jul. 28, 1989, now issued as U.S. Pat. No. 5,347,622, the contents of which are incorporated herein by reference.

While this invention has been described in its preferred form, it will be appreciated that changes may be made in the form, construction, procedure and arrangement of its various elements and steps without departing from its spirit or scope.

What we claim is:

1. Method for storing data in a computer network, the network including a multiplicity of user reception systems at which respective users can request applications during user sessions, the application being generated from the data, the method comprising the steps of:
   a. establishing data stores within the network from which data may be obtained for generating the applications during data usage sessions;
   b. associating storage control parameters with the data to be stored, the control parameters dictating predetermined eligibility of the data for storage at the data stores;
   c. supplying data to the respective stores for use in generating applications; and
   d. retaining data at the stores based on at least the eligibility for storage dictated by the respective storage control parameters.

2. The method of claim 1 wherein associating storage control parameters with the data includes providing a data identification parameter.

3. The method of claim 2 wherein establishing the date stores includes providing the respective stores with a prescribed capacity, and supplying data to the stores includes supplying data in excess of capacity and deleting data on a least-recently-used basis such that retaining data at the respective stores may be determined by the control parameters and by data usage experience.

4. The method of claim 3 wherein associating storage control parameters with the data includes providing a data storage candidacy parameter in addition to the data identification parameter, and wherein retaining data at the respective stores may be determined by respective data storage candidacy parameter and the data usage experience.

5. The method of claim 4 wherein establishing the data stores includes providing first store portions for maintaining data during respective data usage sessions and providing second store portions for maintaining data during and between respective data usage session.

6. The method of claim 5 wherein establishing the data stores includes providing first store portions as a temporary cache, and providing the second store portion as a fixed stage.

7. The method of claim 6 wherein establishing the data stores includes providing the respective temporary caches as file element in a volatile memory element, and providing the respective fixed stages as file elements in a nonvolatile memory element.

8. The method of claim 5 wherein associating storage control parameters with the data includes providing the storage candidacy parameter with a range of values.

9. The method of claim 8 wherein providing the storage candidacy parameter with a range of values includes providing lower storage candidacy parameter values dependent on data sensitive to time.

10. The method of claim 9 wherein associating storage control parameters with the data further includes providing a version control parameter that indicates data currency.

11. The method of claim 10 wherein associating storage control parameters with the data includes providing the candidacy parameter with a range that includes a value which prevents the data from being stored.

12. The method of claim 10 wherein associating storage control parameters with the data includes providing the storage candidacy parameter with a range that includes a value which permits the data to be stored only during data usage session.

13. The method of claim 10 wherein associating storage control parameters with the data includes providing the storage candidacy parameter with a range that includes a value which permits the data to be stored between respective usage sessions.

14. The method of claim 13 wherein retaining data at the stores based on the respective storage control parameters includes retaining the data between data usage sessions independent of the most-recently-used deletion condition.

15. The method of claim 1 wherein establishing data stores at the respective reception systems includes setting the stores respective capacities dependent on the respective reception system storage capacity and the currency requirements of the data.

16. Method for storing data in a computer network, the network including a multiplicity of user reception systems at which respective users can request applications during user sessions, the application being generated from the data, the method comprising the steps of:
   a. establishing data stores of prescribed capacities at the respective reception systems, the stores including first portions maintained during respective user sessions and second portion maintained during and between respective user sessions;
   b. associating storage control parameters with the data to be stored;
   c. supplying data to the stores for use at the respective reception systems in excess of the store capacity and deleting data from the stores on a least-recently-used basis such that the data retained at the stores between respective user sessions will be determined by the storage control parameters of the data and the usage experience at the respective reception systems.

17. The method of claim 16 wherein establishing the data stores includes providing the first store portions as caches and the second store portions as stages.

18. The method of claim 17 wherein establishing the data stores includes providing the store caches in volatile memory and the store stages in nonvolatile memory.

19. The method of claim 18 wherein associating storage control parameters with the data includes providing the storage candidacy parameter with a range of values.

20. The method of claim 19 wherein associating storage control parameters with the data further includes providing a version control parameter that indicates data currency.

* * * * *